United States Patent [19]

Kumazaki

[11] Patent Number: 4,946,356

[45] Date of Patent: Aug. 7, 1990

[54] VENT TYPE INJECTION MOLDING MACHINE

[75] Inventor: Hiroshi Kumazaki, Numazu, Japan

[73] Assignee: Toshiba Kikai Kabushiki Kaisha, Tokyo, Japan

[21] Appl. No.: 333,892

[22] Filed: Apr. 6, 1989

[30] Foreign Application Priority Data

Apr. 11, 1988 [JP] Japan .................................. 63-88386

[51] Int. Cl.⁵ ............................................. B29C 47/76
[52] U.S. Cl. ................................... 425/135; 425/153; 425/203; 425/587; 425/812
[58] Field of Search .................. 366/75; 425/135, 145, 425/149, 153, 166, 203, 544, 586, 587, 812, DIG. 228

[56] References Cited

U.S. PATENT DOCUMENTS

| | | | |
|---|---|---|---|
| 3,376,603 | 4/1968 | Colombo | 425/203 |
| 3,737,151 | 6/1973 | Schaeffer et al. | 366/75 |
| 3,799,234 | 3/1974 | Skidmore | 425/203 |
| 3,992,500 | 11/1976 | Kruder et al. | 425/203 |
| 4,060,226 | 11/1977 | Schweller | 425/203 |
| 4,110,844 | 8/1978 | Nakamura | 425/203 |
| 4,197,268 | 4/1980 | Anders | 425/145 |
| 4,247,519 | 1/1981 | Sano | 425/203 |
| 4,708,620 | 11/1987 | Brugger | 425/145 |
| 4,776,784 | 10/1988 | Batiuk | 425/203 |
| 4,802,267 | 2/1989 | Hosoya | 425/145 |

FOREIGN PATENT DOCUMENTS 61-277421 12/1986 Japan .................................. 425/203

Primary Examiner—Jay H. Woo
Assistant Examiner—C. Scott Bushey
Attorney, Agent, or Firm—Cushman, Darby & Cushman

[57] ABSTRACT

In a vent type injection molding machine having a screw contained in a heating cylinder, there are provided a plurality axially spaced apart vent openings located at intermediate points of the heating cylinder for venting inside of the heating cylinder to the outside and control means for selectively opening and closing the vent openings in accordance with the position of the screw in the heating cylinder or the pressure of a thermoplastic resin injected by the injection molding machine.

5 Claims, 3 Drawing Sheets

VENT TYPE INJECTION MOLDING MACHINE

BACKGROUND OF THE INVENTION

This invention relates to a vent type injection molding machine.

To have better understanding of this invention, a prior art vent type injection molding machine will firstly be described with reference to FIG. 4. The injection molding machine shown therein comprises a screw 1 divided into a first stage a and a second stage b. The first stage a comprises a feed zone F, a compression zone C and a metering zone M starting from a hopper 2. In the same manner, the second stage b also comprises a second feed zone f, a second compression zone C' and a metering zone m. The screw 1 is contained in a heating cylinder 3 heated by electric means, for example, and provided with a nozzle 4 at its outer or front end. A thermoplastic resin supplied to the heating cylinder 3 through hopper 2 is transferred to nozzle 4 by the rotation of screw 1 while being melted or plasticized by the heat of the heating cylinder 3. The quantity of the molten resin is metered by the metering zone m. The heating cylinder 3 is provided with a vent opening 5 at an intermediate point for venting to the outside excessive moisture and volatile components contained in the plasticized resin. The position of the vent opening 5 is selected such that the vent opening would lie in the feed zone f after the screw 1 has plasticized and metered the resin and has retracted over stroke S from the foremost position shown in FIG. 4 to the rearmost position. When the position of the vent opening 5 is selected as above described, since the resin pressure which was increased in the first stage a rapidly decreases to the atmospheric pressure in a region A shown by the resin pressure curve shown in FIG. 4, venting is effected through the vent opening 5.

With the prior art injection molding machine shown in FIG. 4, as the screw 1 has been retracted by a metering stroke S so that the vent opening comes to the outside of the atmospheric pressure region A, the molten resin would flow out to the outside of the cylinder 3, so that a so-called vent-up phenomenon occurs. To prevent this vent-up phenomenon it is necessary to make longer the second feed zone f to be longer than stroke S which not only increases the length of the screw but also the total length of the injection molding machine. Consequently, the total weight and the floor space of the machine increase, which is not economical.

SUMMARY OF THE INVENTION

Accordingly, it is an object of this invention to provide an improved vent type injection molding machine capable of efficiently communicating the inside of the heating cylinder to the outside and preventing a so-called vent-up phenomenon.

Another object of this invention is to decrease the length, occupied floor space and the weight of a vent type injection molding machine by providing a plurality of vent openings through the heating cylinder.

According to one embodiment of this invention, there is provided a vent type injection molding machine comprising a screw contained in a heating cylinder provided with a vent opening, characterized by comprising a plurality of axially spaced apart vent openings located at intermediate points of the heating cylinder for venting inside of the heating cylinder to outside, and means for selectively opening and closing the vent openings in accordance with the position of the screw which is moved during a plasticizing step of a thermoplastic resin injected by the injection molding machine. According to a modified embodiment of this invention, there is provided a vent type injection molding machine comprising a screw contained in a heating cylinder provided with a vent opening, characterized by comprising a plurality of axially spaced apart vent openings located at intermediate points of the heating cylinder for venting inside of the heating cylinder to outside, and means for selectively opening and closing the vent openings in accordance with a pressure of a thermoplastic resin injected by the injection molding machine.

BRIEF DESCRIPTION OF THE DRAWINGS

In the accompanying drawings:

FIGS. 1A and 1B show diagrammatic longitudinal sectional views of the vent type injection molding machine in which FIG. 1A shows the forward limit position of the screw, and FIG. 1B shows the rearward limit position of the screw;

DESCRIPTION OF THE PREFERRED EMBODIMENT

Figure 2:
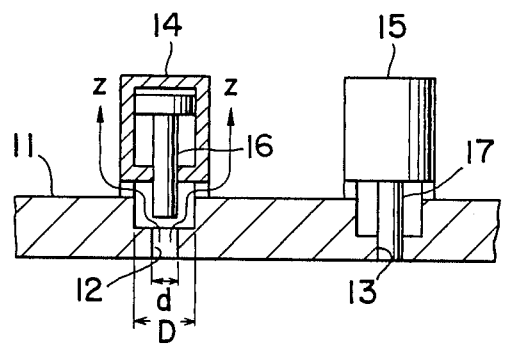
FIG. 2 is a partial sectional view showing the construction of vent openings.
Figure 3:
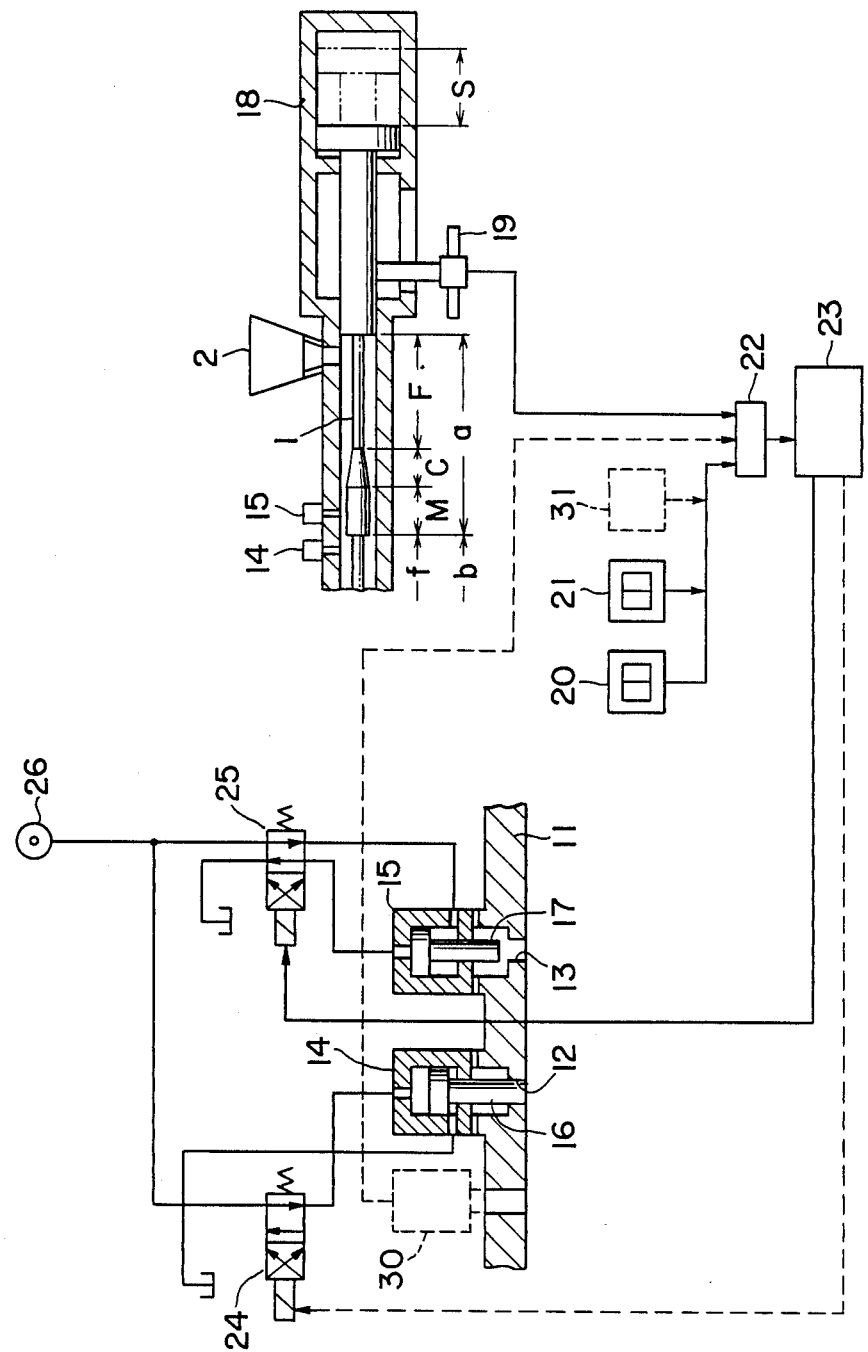
FIG. 3 is a diagrammatic representation of the vent type injection molding machine shown in FIGS. 1A and 1B added with a hydraulic control system for controlling vent openings.
Figure 4:
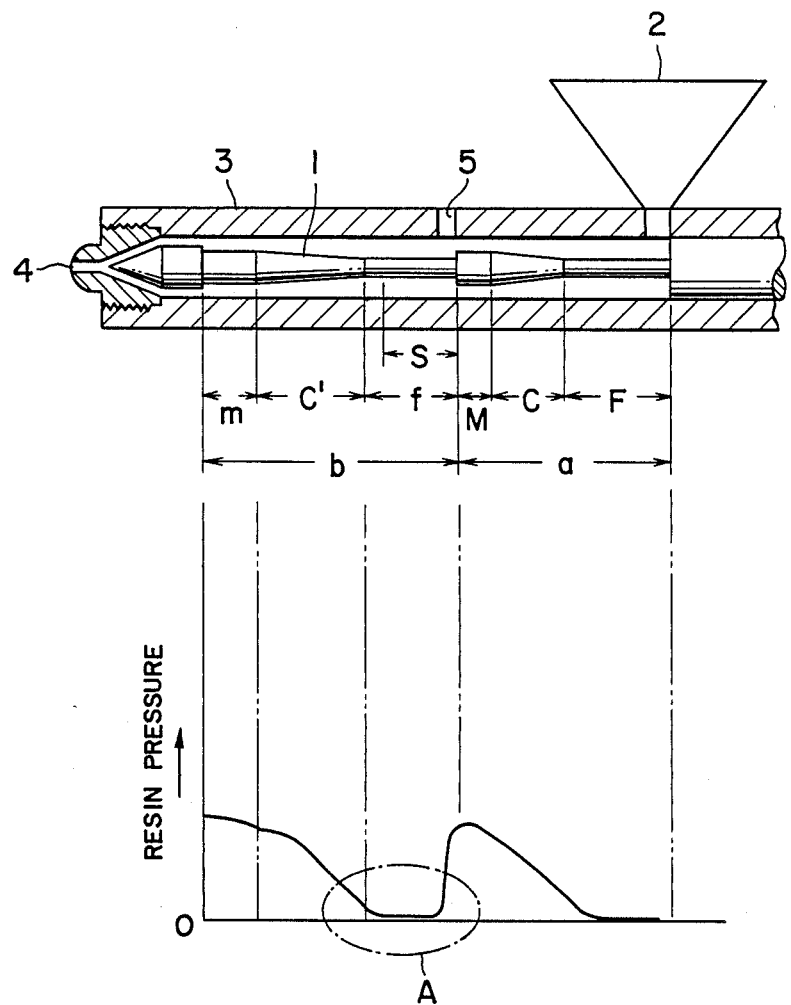
FIG. 4 is a diagrammatic longitudinal sectional view showing a prior art vent type injection molding machine having only one vent opening.

A preferred embodiment of this invention will now be described with reference to FIGS. 1A, 1B, 2 and 3 taking a case wherein two vent openings are provided as an example. In these figures, elements corresponding to those shown in FIG. 4 are designated by the same reference numerals and the description thereof is omitted.

Figure 1A:
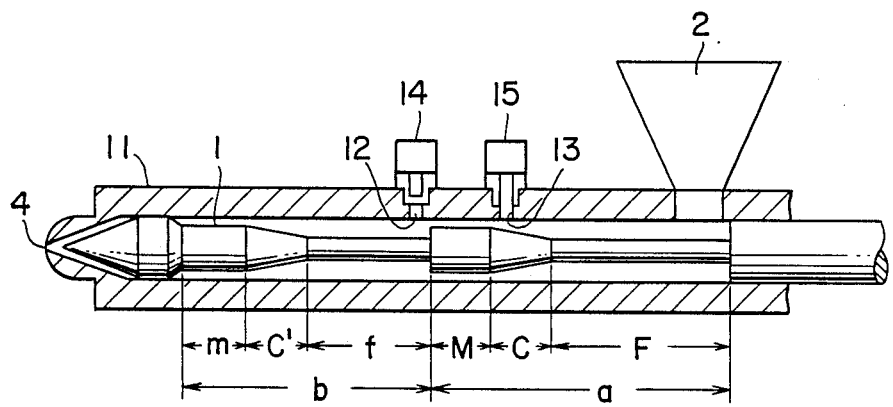
Figure 1B:
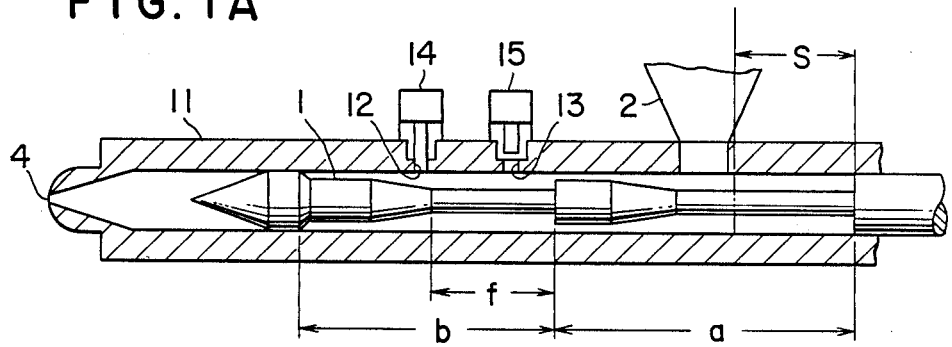

In FIGS. 1A and 1B, a heating cylinder 11 is provided with two axially spaced vent openings 12 and 13 at intermediate points of the heating cylinder 11 in which the screw 1 is reciprocated. As shown in FIG. 2, each vent opening has a small diameter portion d and a large diameter portion D, and plugs 16 and 17 are inserted or removed from the small diameter portion d by hydraulic actuators 14 and 15 respectively such that while the screw 1 is moved over stroke S during the plasticizing step either one of the vent openings 12 and 13 would be opened. Consequently, when either one of the vent openings is opened, moisture and volatile substances are vented to the atmosphere from the inside of the heating cylinder 11 as shown by arrows z. As shown in FIG. 3, an injection cylinder 18 is provided for reciprocating the screw 1.

As shown in FIG. 3, a screw position detector 19 is connected to the piston rod of injection cylinder 18 for constantly detecting the position of the screw 1 while it is reciprocated over the stroke S. Further, screw position setters 20 and 21 are provided for setting the transfer positions of plugs 16 and 17 adapted to open and close vent openings 12 and 13 for determining the operating ranges of the plugs 16 and 17 while the screw is moved over stroke S. There is also provided a comparator 22 which constantly compares the actual screw position detected by screw position detector 19 and the screw positions set by screw position setters 20 and 21. The comparator 22 outputs a transfer signal when both compared signals coincide with each other, the transfer signal being received by a controller 23 for effecting a transfer control of electromagnetic transfer valves 24 and 25. These electromagnetic transfer valves control actuators 14 and 15 respectively for operating plugs 16 and 17. Thus, the electromagnetic transfer valves 24 and 25 supply pressurized oil to actuators 14 and 15 from a source of pressurized oil 26 for opening and closing vent openings 12 and 13.

In operation, during the plasticizing step, and while the screw 1 is moved from the state shown in FIG. 1A showing the forward limit to the state shown in FIG. 1B showing the rearward limit, at first vent opening 12 is opened whereas vent opening 13 is closed. But when the screw 1 passes through transfer positions preset by the screw position setters while the screw is moved over the stroke S, the vent opening 12 would be closed whereas vent opening 13 would be opened.

As above described, during the plasticizing step, while the screw is being moved over the second feed zone f either one of the vent openings 12 and 13 is always communicated to the atmosphere whereby the above pointed out vent-up phenomenon can be eliminated, and it is not necessary to make longer the second feed zone to be longer than the stroke S, thus reducing the entire length of the injection molding machine.

It is clear that the number of the vent openings is not limited to two but three or more vent openings may be used.

As shown in FIG. 3 by dotted lines, instead of using screw position detector 19 and screw position setters 20 and 21 it is also possible to use a detector 30 for detecting the resin pressure in the heating cylinder 11. The detector 30 is located at a position near vent opening 12 or 13 for controlling plugs 16 and 17. In this case, a pressure setter 31 preset with a predetermined resin pressure is provided and the output signals of detector 30 and pressure setter 31 are applied to comparator 22 for controlling electromagnetic transfer valves 24 and 25 in the same manner as above described.

What is claimed is:

1. In a vent type injection molding machine including a heating cylinder, a screw contained in said heating cylinder and formed with first and second stages, each stage having a feed zone, a compression zone and a metering zone, the improvement comprising a plurality of axially spaced apart vent openings for communicating an inside of said heating cylinder to an outside of said cylinder, said vent openings being provided in a range in which said screw is moved in said feed zone of said second stage, and means for selectively opening and closing said vent openings in accordance with a position of said screw which is moved in an axial direction of said heating cylinder during an operation of said injection molding machine.

2. In a vent type injection molding machine including a heating cylinder, a screw contained in said heating cylinder and formed with first and second stages, each stage having a feed zone, a compression zone and a metering zone, the improvement comprising a plurality of axially spaced apart vent openings for communicating an inside of said heating cylinder to an outside of said cylinder, said vent openings being provided in a range in which said screw is moved in said feed zone of said second stage, and means for selectively opening and closing said vent openings in accordance with a pressure of a thermoplastic resin injected by said injection molding machine.

3. The injection molding machine according to claim 1 further comprising a screw position detector which detects an actual position of said screw, a plurality of screw position setters preset with predetermined screw positions, a comparator for comparing an output signal of said screw position detector with output signals of said screw position setters, electromagnetic transfer valves for operating hydraulic actuators of said vent openings and control means for controlling said electromagnetic transfer valves in response to an output signal of said comparator.

4. The injection molding machine according to claim 2 further comprising a pressure detector for detecting a resin pressure in said heating cylinder, a pressure setter preset with a predetermined resin pressure, a comparator for comparing an output signal of said pressure detector with an output signal of said pressure setter, electromagnetic transfer valves for operating hydraulic actuators of said vent openings and control means for controlling said electromagnetic transfer valves in response to an output signal of said comparator.

5. The injection molding machine according to claim 4 wherein said pressure detector is located close to said vent openings in said feed zone.

* * * * *